United States Patent
Takahashi et al.

(10) Patent No.: US 7,004,474 B2
(45) Date of Patent: Feb. 28, 2006

(54) SEAL FOR AN ENDLESS TRACK

(75) Inventors: Kenichi Takahashi, Toyohashi (JP);
Masaki Ohara, Toyohashi (JP);
Akiyoshi Kurihara, Chigasaki (JP);
Seiji Oomura, Toyohashi (JP);
Noriyuki Andou, Tokyo (JP); Takashi Konno, Tokyo (JP); Hiromasa Muraki, Gojo (JP); Akira Muramatsu, Gojo (JP); Shunsuke Tanaka, Shinshiro (JP); Kouji Toriyama, Shinshiro (JP)

(73) Assignees: Topy Kogyo Kabushiki Kaisha, Tokyo (JP); Nippon Valqua Industries, Ltd., Tokyo (JP)

( * ) Notice: Subject to any disclaimer, the term of this patent is extended or adjusted under 35 U.S.C. 154(b) by 0 days.

(21) Appl. No.: 10/602,690

(22) Filed: Jun. 25, 2003

(65) Prior Publication Data
US 2004/0007833 A1    Jan. 15, 2004

(30) Foreign Application Priority Data
Jun. 26, 2002    (JP)    ............................... 2002-186201

(51) Int. Cl.
*F16J 15/34*    (2006.01)
*F16G 13/02*    (2006.01)
(52) U.S. Cl. ...................... 277/402; 277/530; 277/644; 305/102; 305/103
(58) Field of Classification Search ................ 277/530, 277/644, 651, 402; 305/102–104, 105, 106
See application file for complete search history.

(56) References Cited

U.S. PATENT DOCUMENTS

| | | | | |
|---|---|---|---|---|
| 2,841,429 A | * | 7/1958 | McCuistion | 277/402 |
| 3,052,478 A | * | 9/1962 | Horvereid | 277/394 |
| 3,228,705 A | * | 1/1966 | Underwood | 277/558 |
| 3,288,475 A | * | 11/1966 | Benoit | 277/566 |
| 3,550,990 A | * | 12/1970 | Carlson, Jr. et al. | 277/566 |
| 3,560,059 A | * | 2/1971 | Miyake | 305/104 |
| 3,608,913 A | * | 9/1971 | D'Assignies | 277/556 |
| 3,879,044 A | * | 4/1975 | Estes | 277/651 |
| 3,918,726 A | * | 11/1975 | Kramer | 277/651 |
| 4,094,515 A | * | 6/1978 | Araya et al. | 277/402 |
| 4,201,393 A | * | 5/1980 | Kawashima et al. | 277/395 |
| 4,438,935 A | * | 3/1984 | Lees | 277/551 |
| 4,461,488 A | * | 7/1984 | Harms et al. | 305/103 |
| 4,729,754 A | * | 3/1988 | Thuerman | 474/207 |
| 5,261,677 A | * | 11/1993 | Gotoh et al. | 277/438 |
| 5,269,729 A | * | 12/1993 | Thuerman et al. | 474/207 |

(Continued)

FOREIGN PATENT DOCUMENTS

JP    2000-179696    6/2000

(Continued)

*Primary Examiner*—Alison K. Pickard
(74) *Attorney, Agent, or Firm*—Pillsbury Winthrop Shaw Pittman LLP

(57) ABSTRACT

A seal for an endless track has a cross section having a centerline parallel to an axis of the seal and a configuration symmetric with respect to the centerline of the cross section. The seal can include an elastically deformably configured portion having a cross section like alphabetical letter X, and a protrusion extending from an intersection of legs of letter X in a bushing-side direction further than a plane connecting bushing-side end portions of the legs of letter X. The protrusion has an end surface where the protrusion contacts the bushing. The seal can further include an embedding portion embedded in a space between legs of letter X, on a bushing-side of the intersection of the legs of letter X.

8 Claims, 4 Drawing Sheets

U.S. PATENT DOCUMENTS 5,425,679 A * 6/1995 Utz .............................. 474/91
6,149,163 A * 11/2000 Brown et al. ............... 277/560
6,663,112 B1 * 12/2003 Sporre ....................... 277/611

FOREIGN PATENT DOCUMENTS

JP          2001-199372       7/2001

* cited by examiner

SEAL FOR AN ENDLESS TRACK

This application is based on and claims priority from JP 2002-186201 filed on Jun. 26, 2002, the content of which is incorporated herein by reference.

BACKGROUND OF THE INVENTION

1. Field of the Invention

The present invention relates to a seal member for an endless track of a construction vehicle, such as an excavator, a bulldozer or any other vehicle having an endless track.

2. Description of Related Art

As illustrated in FIG. 5, a M-shaped seal 14 for an endless track 10 of a vehicle is mounted between a bushing 11 and a bottom surface 13 of a counter bore of a link 12 of the endless track 10. The M-shaped seal 14 is configured to prevent debris such as water and mud from entering a clearance 16 between a pin 15 and the bushing 11 and to prevent a lubricant filling the clearance between the pin 15 and the bushing 11 from escaping or leaking.

Conventionally, the seal 14 of the endless track 10 has a cross section like alphabetical letter M (hereinafter, M-like seal) as illustrated in columns B of FIGS. 2–4. The M-like seal 14 is mounted between the bushing 11 and the bottom surface 13 of the counter bore of the link 12 with the centerline of letter M held transverse to an axial direction D of the bushing 11. The seal 14 can be compressed in the axial direction D of the bushing 11.

However, M-like seals can lead to uneven wear at certain portions thereof, which can shorten the life of such seals. Different examples of such wear will now be described.

(a) A contact pressure at the contact surface of the M-like seal 14 with the bushing 11 is not uniform (FIG. 6). As a result, wear proceeds more readily at a high-pressure portion of the contact surface than at other portions of the seal 14 (FIG. 7), and an uneven wear happens in the seal 14, which can shorten the life of the seal 14.

(b) When mounted to the endless track 10, a lip portion 17 of the M-like seal 14 is pushed by the bushing 11 to cause a space 18 at the contact surface of the seal 14 with the bushing 11. Mud is likely to enter the space 18 to cause wear to proceed (FIG. 8). When the wear proceeds, the lip 17 is further displaced in a direction away from the bushing 11 to cause more mud or debris to enter the space and to cause the uneven wear to proceed (FIG. 9). As a result, the life of the M-like seal 14 is further shortened.

(c) Since a wear margin of the M-like seal 14 at the contact surface of the seal with the bushing 11 is equal to or less than a thickness of a root 19 of a bushing-side leg of the M-like seal where the seal 14 contacts the bushing 11, the wear margin is small, and the life of the seal can be relatively short.

SUMMARY OF THE INVENTION

An aspect of the present invention is to provide a seal for an endless track where a contact pressure at a contact surface of the seal with a bushing is substantially uniform and an uneven wear is unlikely to happen in the seal.

Another aspect of the present invention is to provide a seal for an endless track where mud, water or debris is unlikely to enter between a contact surface of the seal and a bushing.

Yet another aspect of the present invention is to provide a seal for an endless track where a wear margin of the seal is greater than that of conventional M-like seals.

The above aspects can be achieved by a seal for an endless track in accordance with principles of the present invention.

A seal for an endless track of a vehicle is provided. The seal can be mounted between a bushing and a bottom surface of a counter bore of a link of the endless track. The seal has an axis extending between the bushing and the bottom surface of the counter bore of the link of the endless track and the seal is annular about the axis, wherein the seal has a cross section having a centerline parallel to the axis of the seal and a configuration symmetric with respect to the centerline.

The seal includes an elastically deformably configured portion having a cross section like alphabetical letter X and being elastically deformed when compressed in an axial direction of the seal. The seal has a protrusion extending from an intersection of legs of letter X in a bushing-side direction farther than a plane connecting bushing-side end portions of the legs of letter X. The protrusion has an end surface parallel to the plane connecting bushing-side end portions of the legs of letter X. The protrusion contacts the bushing at the end surface when the seal is mounted to the endless track.

The seal further includes an embedding portion embedded in a space between the legs of letter X, on a bushing-side of the intersection of the legs of letter X and on an intersection-side of the plane connecting busing-side end portions of the legs of letter X, with a seal material.

Since the seal has a cross section having right and left portions symmetric to each other with respect to the centerline, the contact pressure of the seal with the bushing is uniform. As a result, uneven wear in the seal is reduced.

When the seal has the elastically deformably configured portion, the contact surface of the seal with the bushing can follow the bushing so that mud is unlikely to enter between the contact surface of the seal and the bushing. Since the contact surface of the seal with the bushing has no lip offset from the centerline unlike conventional M-like seals, a clearance due to the lip is not caused at the contact surface of the seal with the bushing. As a result, mud is unlikely to enter between the seal and the bushing.

When the seal includes the embedding portion embedded in the space between the legs of letter X and on the bushing-side of the intersection of the legs of letter X, a wear margin of the contact surface of the seal with the bushing becomes greater than that of conventional M-like seals to be mounted in an endless track of the same size of vehicle. As a result, the life of the seal can be improved.

BRIEF DESCRIPTION OF THE DRAWINGS

The above aspects and other aspects, objects, features, and advantages of the present invention will become apparent and will be more readily appreciated from the following detailed description of the preferred embodiments of the present invention in conjunction with the accompanying drawings, in which.

DETAILED DESCRIPTION OF THE PREFERRED EMBODIMENTS

Figure 1:
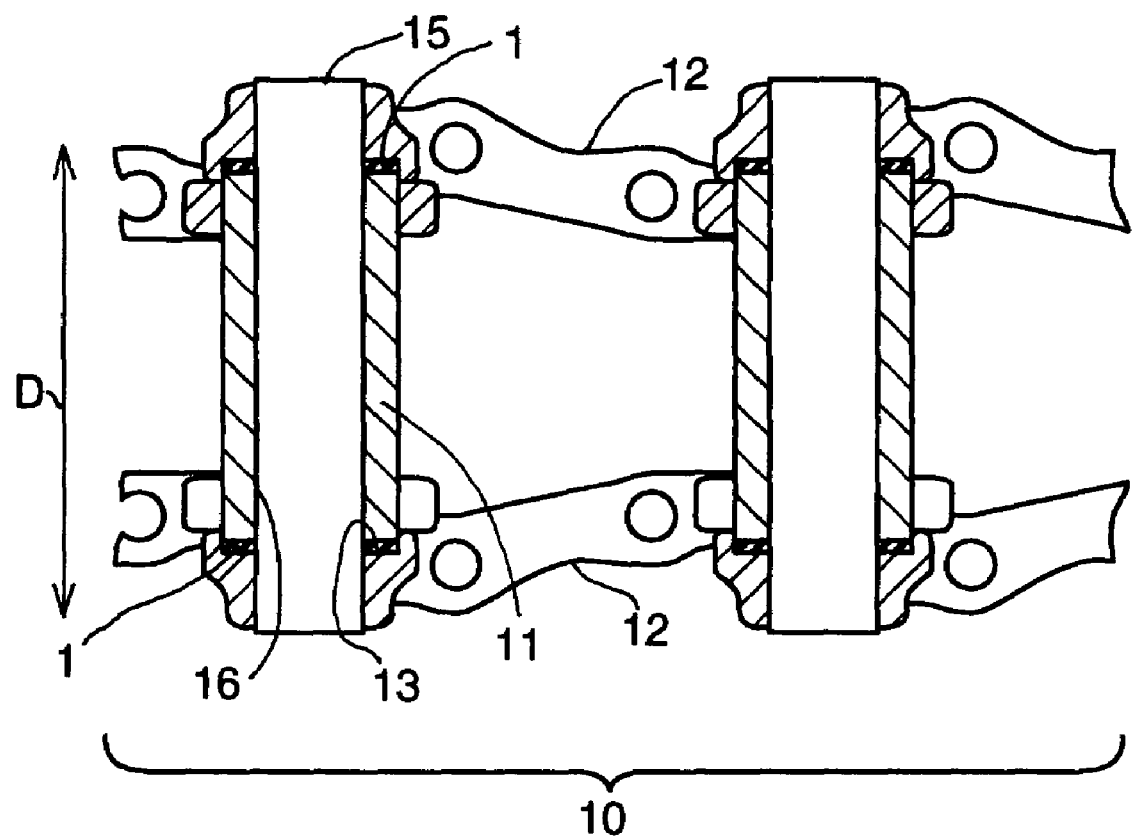
FIG. 1 is a plan view of a portion of an endless track of a vehicle to which a X-like seal according to principles of the present invention is mounted.
Figure 2:
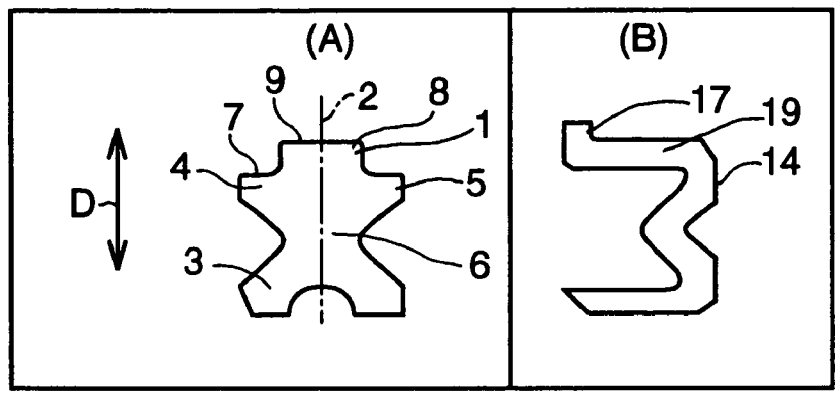
FIG. 2 includes cross-sectional views of the X-like seal of FIG. 1 shown in column A and of a conventional M-like seal shown in column B.
Figure 3:
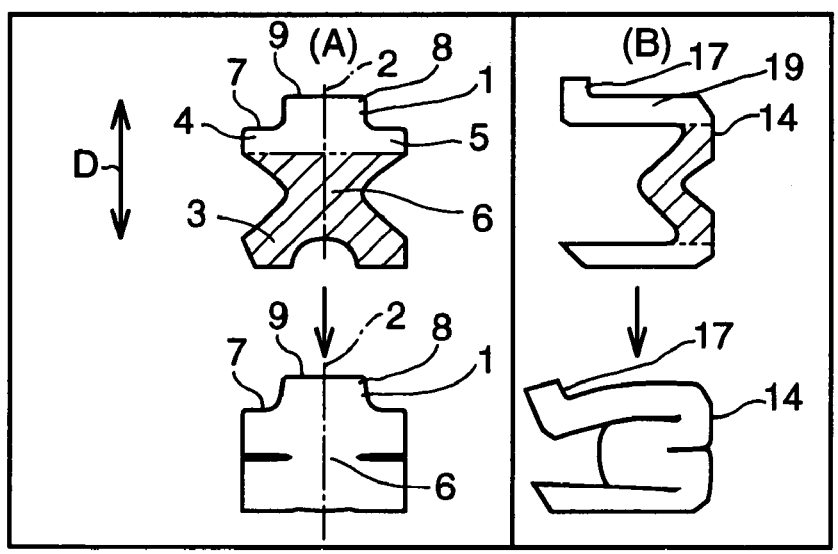
FIG. 3 includes cross-sectional views of the X-like seal of FIG. 2 in a free state and in a compressed state shown in column A and of the M-like seals of FIG. 2 in a free state and in a compressed state shown in column B, wherein elastically deformably configured portions of each seal are hatched.
Figure 4:
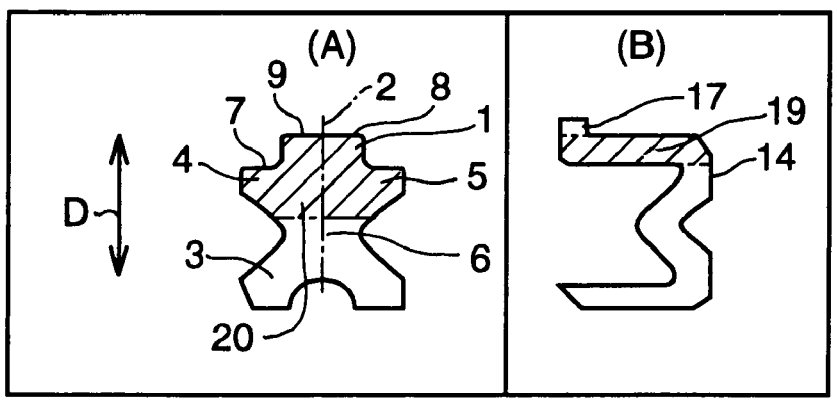
FIG. 4 includes cross-sectional views of the X-like seal of FIG. 2 shown in column A and of the M-like seal of FIG. 2 shown in column B, wherein wear margins of each seal are hatched.
Figure 5:
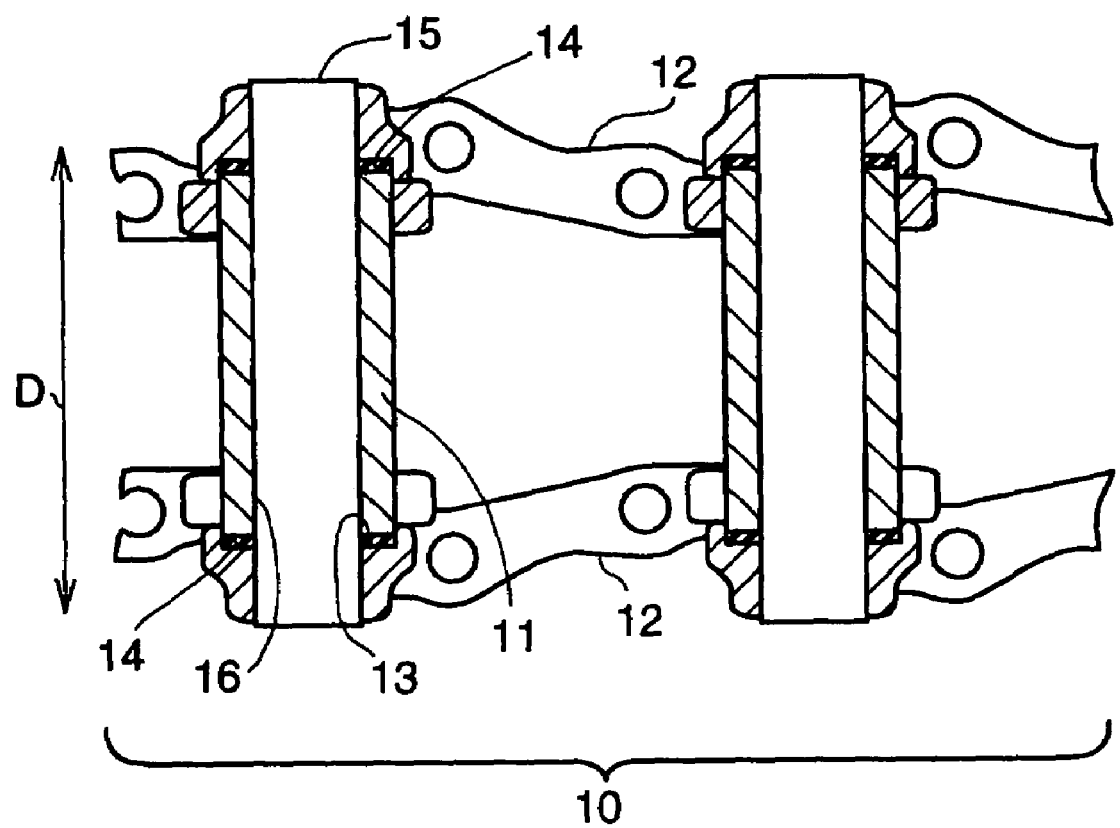
FIG. 5 is a plan view of a portion of an endless track to which the M-like seal of FIG. 2 is mounted.
Figure 6:
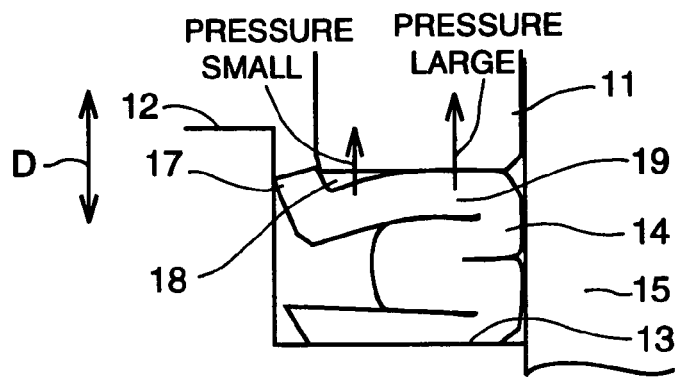
FIG. 6 is a cross-sectional view of the M-like seal of FIG. 5 mounted to an endless track and in a compressed state.
Figure 7:
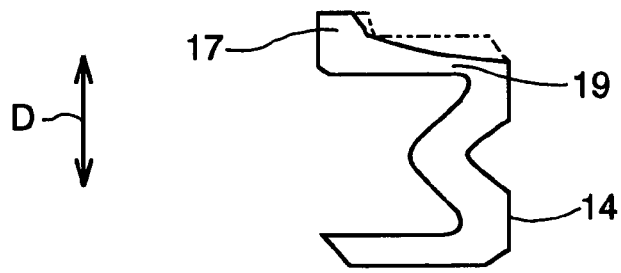
FIG. 7 is a cross-sectional view of the M-like seal of FIG. 5 in an unevenly worn state.
Figure 8:
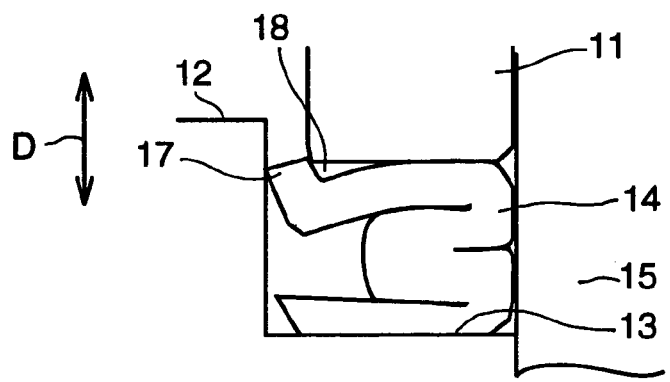
FIG. 8 is a cross-sectional view of the M-like seal of FIG. 5 in a state that a clearance due to a lip is caused between the seal and a bushing.
Figure 9:
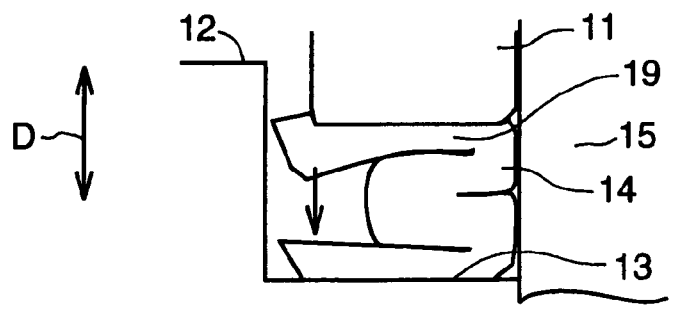
FIG. 9 is a cross-sectional view of the M-like seal of FIG. 5 in a state that the uneven wear has proceeded.

A generally X-shaped (X-like) seal, generally shown as 1, for an endless track 10 of a vehicle according to principles of the present invention will be explained with reference to FIGS. 1–4. FIG. 1 shows the generally X-shaped seal 1 mounted to a portion of the endless track 10. In FIGS. 2–4, the seal 1 is shown in column A and the above-described conventional M-like seal 14 is shown in column B for comparison.

The seal 1 is an annular seal which is continuous over an entire circumference in a circumferential direction. In FIG. 1, the seal 1 is mounted between a bushing 11 of the endless track 10 and a bottom surface 13 of a counter bore of a link 12 of the endless track 10. The seal 1 and the bushing 11 have a common axis. A contact pressure is loaded on the seal 1 from the bushing 11.

The seal 1 can include an elastomer such as urethane rubber, vulcanized rubber, or other deformable materials.

As illustrated in FIG. 2, the seal 1 has a cross section symmetric (having right and left portions symmetric to each other) with respect to a centerline 2, which is parallel to an axis of the bushing 11 that extends in an axial direction D of the bushing 11. The symmetry of the cross section of the seal 1 with respect to the centerline 2 is maintained not only before the seal is mounted to the endless track 10 in a free state thereof (when no axial load acts on the seal 1) but also when an axial load acts on the seal 1 (in a compressed state thereof). When the seal 1 is elastically deformed, the symmetry of the cross section is maintained.

As illustrated in FIGS. 2 and 3, the seal 1 includes an elastically deformably configured portion 3 having opposite bushing-side portions of legs of the X-shape of the seal 1. The elastically deformably configured portion 3 has a cross section like alphabetical letter X or generally X-shaped (hereinafter, letter X) and is elastically deformable in the axial direction D of the bushing 11. The elastically deformably configured portion 3 is elastically deformable in an axial direction of the seal 1 when compressed in the axial direction D of the bushing 11. The seal 1 also includes protrusion 8 that extends from an intersection 6 of legs 4 and 5 of letter X in a bushing-side direction (a direction toward the bushing 11) farther than a plane 7 connecting bushing-side end portions of the legs 4 and 5 of letter X. The protrusion 8 has an end surface or contact surface 9 parallel to the plane 7 connecting the bushing-side end portions of the legs 4 and 5 of letter X. The protrusion 8 contacts the bushing 11 at the end surface 9 when the seal 1 is mounted to the endless track 10. The end surface or contact surface 9 and the plane 7 connecting bushing-side end portions of the legs 4 and 5 of letter X are generally transverse to the axial direction D of the bushing 11.

A width of the protrusion 8 and a width of the contact surface 9 in the right and left directions of the seal 1 are smaller than a width of the plane 7 in the right and left directions of the seal 1 and are substantially equal to a width of the seal 1 at the intersection 6 of the legs 4 and 5 of letter X. The legs 4 and 5 have second end surfaces on the side opposite the bushing 11, which are perpendicular to the axial direction D of the bushing 11 and which stably contact the bottom surface 13 of the counter bore of the link 12.

As illustrated in FIG. 4, the seal 1 further includes an embedding portion 20 embedded in a space between right and left bushing-side portions of the legs 4 and 5 of letter X, on a bushing-side of the intersection 6 of the legs 4 and 5 of letter X and on an intersection-side of the plane 7 connecting the bushing-side end portions of the legs 4 and 5 of letter X, with a seal material to form a solid structure integral with the right and left bushing-side portions of the legs 4 and 5 and the protrusion 8.

When no load is loaded on the seal 1 in the axial direction D of the bushing 11, that is, in a free state of the seal 1, there remain spaces which are not filled with a seal material, on a side of the intersection 6 opposite the bushing 11 and on right and left sides of the intersection 6, so that the portion 3 is elastically deformable due to the X-shaped configuration. When a large load is loaded on the seal 1 in the axial direction D of the bushing, as illustrated in FIG. 3, the seal 1 deforms mainly at the elastically deformably configured portion 3, and those spaces on the side of the intersection 6 opposite the bushing 11 and on the right and left sides of the intersection 6 are removed. Even when those spaces are removed, the protrusion 8 still extends toward the bushing 11 farther than the plane 7 connecting the bushing-side end portions of the legs 4 and 5 of letter X.

Since the seal 1 has a cross section symmetric in the right and left directions with respect to the centerline 2 (column A of FIG. 2), the contact pressure at the contact surface 9 of the seal 1 with the bushing 11 is substantially uniform. Therefore, an uneven wear is unlikely to occur in the seal 1. Contrarily, as illustrated in column B of FIG. 2, since the conventional M-like seal 14 has a cross section which is non-symmetric in the right and left directions with respect to a centerline of the cross section and since the leg of the M-like seal is supported in the manner of a cantilever, the contact load concentrates at the root 19 of the leg. In the M-like seal, the load becomes uneven so that an uneven wear occurs. In contrast, since no uneven wear happens in the seal 1, wear proceeding in the seal 1 is suppressed compared with the case of M-like seal, and the life of the seal 1 is improved over the life of the M-like seal.

Since the seal 1 has the elastically deformably configured portion 3 (hatched portion in column A of FIG. 4), the contact surface 9 of the seal 1 with the bushing 11 can follow the bushing 11 so that mud or other debris is unlikely to enter a clearance between the seal 1 and the bushing 11. Since the seal 1 has no lip offset from the centerline 2 at the contact surface 9 with the bushing 11 unlike lip 17 of the conventional M-like seal 14, a clearance due to the lip is not caused between the seal 1 and the bushing 11, and mud or other debris is unlikely to enter such clearance generated due to the lip. If mud or other debris enters such a clearance, the contact surface will further incline and an uneven wear will further proceed. In seal 1, such uneven wear is suppressed.

As illustrated in FIG. 4, since the seal 1 includes the embedding portion 20 embedded in the space between the bushing-side portions of the legs 4 and 5 of letter X and on the bushing-side of the intersection 6 of the legs 4 and 5 of letter X, a portion of the seal 1 on the bushing side of the intersection 6 becomes a wear margin for the contact surface 9 of the seal 1 with the bushing 11. The wear margin of the seal 1 becomes greater than that of the conventional M-like seal 14 to be mounted in an endless track of the same size of vehicle. As a result, the life of seal 1 is improved over the life of the M-like seal 14. Contrarily, as illustrated in column B of FIG. 4, the root portion of the leg of the M-like seal 14 becomes a wear margin of the seal 14. Since the margin is thin, the wear concentrates at the root 19 of the leg of the M-like seal 14 and the life of the M-like seal 14 is relatively short.

The seal 1 has the symmetric cross section with respect to the centerline 2 which allows the contact pressure at the contact surface 9 of the seal 1 with the bushing 11 to be substantially uniform and to suppress an uneven wear.

When the seal 1 has the elastically deformably configured portion 3, the seal 1 can follow the bushing 11 so that mud or other debris is unlikely to enter a clearance between the seal 1 and the bushing 11. Further, since the legs 4 and 5 of the seal 1 do not have a lip and since the contact surface 9 is flat, a clearance due to a lip is not generated between the seal 1 and the bushing 11, and mud or other debris is unlikely to enter between the seal 1 and the bushing 11.

When the seal 1 includes the embedding portion 20 embedded in the space between the legs 4 and 5 of letter X on the bushing-side of the intersection 6 of the legs 4 and 5 of letter X, a wear margin of the contact surface 9 of the seal 1 with the bushing 11 becomes greater than that of the conventional M-like seal 14 when mounted in an endless track of the same size of vehicle. As a result, the life of the seal 1 is improved over the life of the M-like seal 14.

The foregoing description of the embodiments of the present invention provides illustration and description, but is not intended to be exhaustive or to limit the invention to the precise form described. Modifications and variations are possible that are consistent with the above teachings or may be acquired from practice of the invention. For example, the various features of the invention, which are described in the contexts of separate embodiments for the purposes of clarity, may also be combined in a single embodiment. Conversely, the various features of the invention which are, for brevity, described in the context of a single embodiment may also be provided separately or in any suitable sub-combination. Accordingly, it will be appreciated by persons skilled in the art that the present invention is not limited to what has been particularly shown and described hereinabove. Rather, the scope of the present invention is defined by the attached claims and their equivalents, in combination with the above description and attached drawings.

What is claimed is:

1. A seal for an endless track of a construction vehicle, the seal being mounted to the endless track and being elastically deformable along an axial direction of the seal into a compressed state, the seal comprising:
    right and left bushing-side portion of legs extending in a direction toward a bushing and outwardly away from one another;
    right and left opposite bushing-side portions of the legs extending in a direction away from the bushing and outwardly away from one another; and
    a protrusion extending from an intersection of the legs only in a bushing-side direction farther than a plane connecting bushing-side end portions of the right and left bushing-side portions of the legs, said protrusion having an end surface parallel to said plane such that said end surface contacts said bushing to provide a sealing surface when said seal is mounted to said endless track;
    a vacant gap portion disposed directly opposite to said protrusion,
    wherein the right and left bushing-side portion of the legs are moved to be adjacent the right and left opposite bushing-side portions of the legs, respectively, and said vacant gap portion collapses when the seal is elastically deformed in the compressed state thereof.

2. A seal according to claim 1, further comprising an elastically deformably configured portion having a cross section like alphabetical letter X and being elastically deformed when compressed in an axial direction of said seal when said seal is in the compressed state thereof.

3. A seal according to claim 1, further comprising an embedding portion embedded in a space between right and left bushing-side portions of the legs, on a bushing-side of said intersection of the legs and on an intersection-side of said plane connecting bushing-side end portions of the right and left bushing-side portions of the legs, with a seal material.

4. A seal according to claim 1, wherein the seal includes an elastomer.

5. A seal according to claim 1, wherein the right and left bushing-side portions of the legs and the right and left opposite bushing-side portions of the legs are constructed and arranged such that the seal has a generally X-shaped cross-section when the seal is in the free, uncompressed state thereof.

6. A seal for an endless track of a construction vehicle to be mounted between a bushing and a bottom surface of a counter bore of a link of said endless track, said seal comprising:
    an axis wherein said seal is annular about said axis;
    a cross section having a centerline parallel to said axis of said seal and a configuration symmetric with respect to said centerline;
    an elastically deformably configured portion having a cross section like alphabetical letter X and being elastically deformed when compressed in an axial direction of said seal;
    a protrusion extending from an intersection of legs of said letter X only in a bushing-side direction farther than a plane connecting bushing-side end portions of the legs of said letter X;
    a vacant gap portion disposed directly opposite to said protrusion, said vacant gap portion configured to collapse when compressed in the axial direction of said seal; and
    an embedding portion embedded in an entire portion of a space between said legs of said letter X, on a bushing-side of said intersection of said legs of said letter X and on an intersection-side of said plane connecting bushing-side end portions of the legs of said letter X, with a seal material,
    wherein said protrusion has an end surface parallel to said plane connecting bushing-side end portions of the legs of said letter X and said protrusion contacts said bushing at said end surface to provide a sealing surface when said seal is mounted to said endless track.

7. A seal according to claim 6, wherein the seal includes an elastomer.

8. A seal according to claim 6, wherein the seal has a generally X-shaped cross-section.

* * * * *